United States Patent
Pu

(10) Patent No.: US 9,019,812 B2
(45) Date of Patent: Apr. 28, 2015

(54) METHOD, SYSTEM, AND DEVICE FOR MANAGING ADDRESSES ON ETHERNET RING NETWORK

(71) Applicant: Huawei Technologies Co., Ltd., Shenzhen, Guangdong (CN)

(72) Inventor: Yun Pu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 163 days.

(21) Appl. No.: 13/675,753

(22) Filed: Nov. 13, 2012

(65) Prior Publication Data

US 2013/0064075 A1     Mar. 14, 2013

Related U.S. Application Data

(63) Continuation of application No. PCT/CN2010/079365, filed on Dec. 2, 2010.

(30) Foreign Application Priority Data

May 13, 2010   (CN) .......................... 2010 1 0176166

(51) Int. Cl.
    *H04L 12/437*      (2006.01)
    *H04L 12/46*       (2006.01)

(52) U.S. Cl.
    CPC .......... *H04L 12/437* (2013.01); *H04L 12/4641* (2013.01)

(58) Field of Classification Search
    None
    See application file for complete search history.

(56) References Cited

U.S. PATENT DOCUMENTS

| 2008/0222447 | A1* | 9/2008 | Ram et al. ........................... 714/2 |
| 2009/0016214 | A1* | 1/2009 | Alluisi et al. .................. 370/228 |
| 2009/0175166 | A1* | 7/2009 | Long et al. ..................... 370/225 |
| 2009/0185566 | A1* | 7/2009 | Ogasahara et al. ......... 370/395.3 |
| 2009/0196172 | A1  | 8/2009 | Long |
| 2009/0207726 | A1* | 8/2009 | Thomson et al. ............. 370/216 |

(Continued)

FOREIGN PATENT DOCUMENTS

| CN | 101141365 A | 3/2008 |
| CN | 101232427 A | 7/2008 |

(Continued)

OTHER PUBLICATIONS

Supplementary European Search Report dated Dec. 12, 2012 in connection with European Patent Application No. EP 10 85 1306.

(Continued)

*Primary Examiner* — Hassan Phillips
*Assistant Examiner* — Duc Duong

(57) ABSTRACT

The present invention discloses a method, system, and device for managing addresses on an Ethernet ring network. The method includes: receiving, by a master node on an Ethernet ring network, a failure message from a node connected to at least one of two ends of a failed link on the Ethernet ring network; determining, according to the failure message, a specific virtual local area network affected by the failure on the Ethernet ring network; and sending an instruction message for flushing a media access control address forwarding table to a specific node accessed by the specific virtual local area network on the Ethernet ring network, where the instruction message carries an identifier of the specific virtual local area network, so that the specific node deletes addresses related to the specific virtual local area network.

10 Claims, 6 Drawing Sheets

(56) References Cited

U.S. PATENT DOCUMENTS

| | | | |
|---|---|---|---|
| 2010/0226260 A1* | 9/2010 | Zinjuvadia et al. | 370/248 |
| 2010/0315946 A1 | 12/2010 | Salam et al. | |
| 2011/0158241 A1* | 6/2011 | Wang et al. | 370/395.53 |
| 2011/0292789 A1 | 12/2011 | Long et al. | |
| 2012/0230346 A1* | 9/2012 | Thyni | 370/412 |
| 2013/0064071 A1* | 3/2013 | Bos et al. | 370/223 |

FOREIGN PATENT DOCUMENTS

| | | |
|---|---|---|
| CN | 101232428 A | 7/2008 |
| CN | 101272310 A | 9/2008 |
| CN | 101425953 A | 5/2009 |
| CN | 101483573 A | 7/2009 |
| CN | 101815107 A | 8/2010 |
| EP | 2 099 158 A1 | 9/2009 |
| EP | 2 367 320 A1 | 9/2011 |
| WO | WO 2008/120931 A1 | 10/2008 |

OTHER PUBLICATIONS

International Search Report dated Mar. 10, 2011 in connection with International Patent Application No. PCT/CN2010/079365.
Written Opinion of the International Searching Authority dated Mar. 10, 2011 in connection with International Patent Application No. PCT/CN2010/079365.
"G.8032, Ethernet Ring Protection Overview", Mar. 2008, 23 pages.
Partial Translation of Office Action dated Aug. 2, 2012 in connection with Chinese Patent Application No. 201010176166.0.
Partial Translation of Office Action dated Sep. 26, 2011 in connection with Chinese Patent Application No. 201010176166.0.

* cited by examiner

METHOD, SYSTEM, AND DEVICE FOR MANAGING ADDRESSES ON ETHERNET RING NETWORK

CROSS-REFERENCE TO RELATED APPLICATIONS

This application is a continuation of International Application No. PCT/CN2010/079365, filed on Dec. 2, 2010, which claims priority to Chinese Patent Application No. 201010176166.0, filed on May 13, 2010, both of which are hereby incorporated by reference in their entireties.

TECHNICAL FIELD

The present invention relates to the field of network communication technologies, and in particular, to a method, system, and device for managing addresses on an Ethernet ring network.

BACKGROUND

The Ethernet ring network, owing to its special network topology structure, facilitates the implementation of simple and fast network protection. On the Ethernet ring network, to forward packets rapidly, nodes on the Ethernet ring network need to maintain a destination media access control (MAC, Media Access Control) address forwarding table. The MAC address forwarding table is a layer 2 forwarding table based on ports, and is a basis for implementing fast forwarding of layer 2 packets. When a node on the Ethernet ring network receives a data frame from a port of the node, the node reads a MAC address encapsulated in the data frame, looks up a previously built MAC address forwarding table to find a port corresponding to the destination MAC address from the MAC address forwarding table, and forwards the data frame from the port; other ports are not affected. In this way, collision with data on other ports is avoided. The process of building or updating the MAC address forwarding table is also called MAC address learning.

On the existing Ethernet ring network, when a link on the Ethernet ring network fails, all nodes on the Ethernet ring network need to delete respective MAC address forwarding entries and re-learn the MAC addresses. Currently, some optimized technologies for deleting MAC address forwarding entries avoid some unnecessary MAC address deletion and re-learning. Details are as follows.

When a link between two adjacent nodes on the Ethernet ring network fails, a node can detect the failure, and send a failure message to a master node; after receiving the failure message, the master node judges whether the failed link is a ring protection link where a normally blocked port is located; if the failed link is the ring protection link where the normally blocked port is located, the master node does not send an instruction message for flushing the MAC address forwarding table to other nodes on the ring; if the failed link is not the ring protection link where the normally blocked port is located, the master node sends an instruction message for flushing the MAC address forwarding table to other nodes on the ring in broadcast mode. The sending of the instruction message for flushing the MAC address forwarding table is controlled according to the relationship between the failed link and the ring protection link where the normally blocked port is located, which avoids some unnecessary deletion operations.

In the prior art of VID, each node of the Ethernet ring network learns a MAC address each time when receiving a data frame. Therefore, there are a large number of MAC address forwarding entries. When a link fails so that original MAC address forwarding entries need to be deleted and MAC addresses need to be re-learned, a large amount of data needs to be deleted, especially the MAC address forwarding entries that need to be deleted by the master node. Therefore, it takes a long time to delete the MAC address forwarding entries and it takes a long time to re-learn the MAC addresses. As a result, fast recovery of services cannot be implemented properly and high requirements are imposed on hardware devices. Although the existing optimization solutions already avoid some unnecessary deletion operations, all unnecessary deletion operations cannot be avoided. Therefore, the fast recovery of services cannot be implemented properly.

SUMMARY

Embodiments of the present invention provide a method, system, and device for managing addresses on an Ethernet ring network to implement fast protection on the Ethernet ring network, where the managing addresses includes instructing nodes on the Ethernet ring network to flush addresses and flushing addresses by the nodes on the Ethernet ring network.

A method for instructing nodes on an Ethernet ring network to flush addresses is provided. The Ethernet ring network includes multiple nodes, each node includes ring ports used to connect adjacent nodes, and at least one node includes a non-ring port used to access a virtual local area network. The method includes:

receiving a failure message from a node connected to at least one of two ends of a failed link on the Ethernet ring network;

determining, according to the failure message, a specific virtual local area network affected by the failure on the Ethernet ring network; and sending an instruction message for flushing a media access control address forwarding table to a specific node accessed by the specific virtual local area network on the Ethernet ring network, where the instruction message carries an identifier of the specific virtual local area network, so that the specific node deletes addresses related to the specific virtual local area network.

An Ethernet node device is provided, which includes:

a message receiving module, configured to receive a failure message from a node connected to at least one of two ends of a failed link on an Ethernet ring network;

a virtual local area network determining module, configured to determine, according to the failure message, a specific virtual local area network affected by the failure; and a sending module, configured to send an instruction message for flushing a MAC address forwarding table to at least one node on the Ethernet ring network, where the instruction message carries an identifier of the specific virtual local area network, so that a specific node accessed by the specific virtual local area network flushes addresses related to the specific virtual local area network.

A method for instructing nodes on an Ethernet ring network to flush addresses is provided. The Ethernet ring network includes multiple nodes, each node includes ring ports used to connect adjacent nodes, and at least one node includes a non-ring port used to access a virtual local area network. The method includes:

detecting that a link connected to a ring port of a node on the Ethernet ring network fails;

determining a specific virtual local area network affected by the failure; and sending a failure message to a master node on the Ethernet ring network, where the failure message carries an identifier of the specific virtual local area network, so that the master node instructs a specific node accessed by the specific virtual local area network to delete addresses related to the specific virtual local area network.

An Ethernet node device is provided, which includes:

a detecting module, configured to detect that a link connected to a ring port of a node on an Ethernet ring network fails;

a virtual local area network determining module, configured to determine a specific virtual local area network affected by the failure; and a sending module, configured to send a failure message to a master node on the Ethernet ring network, where the failure message carries an identifier of the specific virtual local area network, so that the master node instructs a specific node accessed by the specific virtual local area network to delete addresses related to the specific virtual local area network.

A method for flushing addresses by nodes on an Ethernet ring network is provided. The Ethernet ring network includes multiple nodes, each node includes ring ports used to connect adjacent nodes, and at least one node includes a non-ring port used to access a virtual local area network. The method includes:

receiving, by a node on the Ethernet ring network, an instruction message for flushing a media access control address forwarding table, where the instruction message carries an identifier of a specific virtual local area network affected by a failure; and deleting, by the node on the Ethernet ring network according to the identifier of the specific virtual local area network, addresses related to the specific virtual local area network in the locally stored media access control address forwarding table, and not deleting forwarding addresses irrelevant to the specific virtual local area network.

An Ethernet node device is provided, which includes:

a receiving module, configured to receive an instruction message for flushing a media access control address forwarding table, where the instruction message carries an identifier of a specific virtual local area network affected by a failure;

an address configuring module, configured to learn media access control addresses, and configure the learned media access control addresses into the media access control address forwarding table, where the media access control address forwarding table records a corresponding relationship between virtual local area networks identifiers, media access control addresses, and egress port addresses, and each virtual local area network identifier corresponds to at least one media access control address and at least one egress port address; and a flushing module, configured to delete, according to the identifier of the specific virtual local area network affected by the failure carried in the instruction message, addresses related to the identifier of the specific virtual local area network in the media access control address forwarding table, and not delete addresses irrelevant to the identifier of the specific VLAN.

An Ethernet ring network system is provided. The Ethernet ring network system includes multiple nodes connected into a ring, each node is connected to adjacent nodes through respective ring ports, and at least one node has a non-ring port for accessing a virtual local area network. The Ethernet ring network system includes:

a first node, configured to detect that a link connected to a ring port of the first node fails, and send a failure message to a second node in the Ethernet ring network system;

the second node, configured to determine, according to the failure message, a specific virtual local area network affected by the failure in the Ethernet ring network system, and send an instruction message for flushing a media access control address forwarding table to at least one node in the Ethernet ring network system, where the instruction message carries an identifier of the specific virtual local area network; and a node accessed by the specific virtual local area network, configured to receive the instruction message, delete, according to the identifier of the specific virtual local area network in the instruction message, addresses related to the specific virtual local area network in the locally stored media access control address table, and not delete addresses irrelevant to the specific virtual local area network.

In the embodiments of the present invention, multiple VLANs are allowed to access the Ethernet ring network; there are multiple nodes on the Ethernet ring network; after a node adjacent to a failure detects the failure, the node sends a failure message to a master node; the master node determines, according to the failure message, a specific VLAN affected by the failure, and sends an instruction message for flushing a MAC address forwarding table to at least one node on the Ethernet ring network, where the instruction message carries an identifier of the specific VLAN affected by the failure, so that a node accessed by the VLAN affected by the failure can delete addresses related to the VLAN according to the instruction message. In this way, the deletion of address entries in the MAC address forwarding table is confined to a specified node and a specified VLAN, which greatly reduces the time of deleting MAC address forwarding entries and re-learning the MAC addresses, thereby greatly reducing the service interruption time and implementing fast recovery of services.

DETAILED DESCRIPTION

Figure 1A:
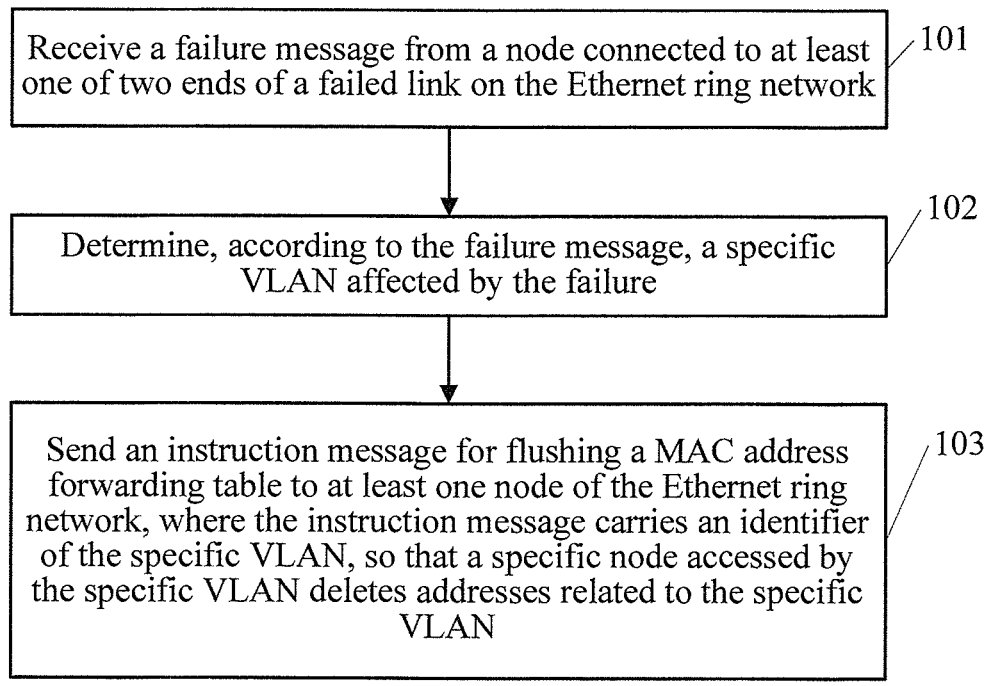
FIGS. 1A to 1C are flowcharts of a method for instructing nodes on an Ethernet ring network to flush addresses.

Embodiments of the present invention provide a method, system, and device for managing addresses on an Ethernet ring network to implement protection on the Ethernet ring network. The managing addresses includes operations of instructing nodes on the Ethernet ring network to flush addresses and flushing addresses by the nodes on the Ethernet ring network.

An Ethernet ring network system provided in embodiments of the present invention includes multiple nodes connected into a ring, where each node is connected to adjacent nodes through respective ring ports and at least one node includes a non-ring port used to access a VLAN. The Ethernet ring network system may provide multiple access VLANs with a VLAN forwarding function. As in the prior art, each VLAN represents a logical local area network, and may be differentiated from other VLANs by using a VLAN identifier (VID, VLAN identifier). Each VLAN is a broadcast domain, in which communication between hosts is like communication in a local area network, but no direct communication is enabled between VLANs.

The Ethernet ring network system includes a first node (a failure detection node), configured to detect that a link connected to a ring port of the first node fails and send a failure message to a second node in the Ethernet ring network system, where the second node may be a master node in the Ethernet ring network system. The second node is configured to determine, according to the failure message, a specific VLAN affected by the failure in the Ethernet ring network system, and send an instruction message for flushing a media access control address table to at least one node in the Ethernet ring network system, where the instruction message carries an identifier of the specific VLAN. The Ethernet ring network system has a node accessed by the specific VLAN, and the node is configured to receive the instruction message, delete addresses related to the specific VLAN in the locally stored media access control address table according to the identifier of the specific VLAN in the instruction message, and not delete addresses irrelevant to the specific VLAN. The second node may determine a failure location according to node identifiers carried in the failure message, and determine, according to the determined failure location and a pre-configured VLAN distribution topology, a specific VLAN affected by the failure in the Ethernet ring network system, where the VLAN distribution topology is used to indicate VLANs accessing the Ethernet ring network system and a topological path of nodes that each VLAN passes through. If the failure message carries identifier of VLANs to which the failed link belongs, the second node may also obtain the identifier of a specific VLAN according to the failure message to determine the specific VLAN affected by the failure. The following describes in detail the operation flow and configuration of each node in the Ethernet ring network system provided in embodiments of the present invention. In the following description, the second node is called the master node, and a node accessed by a VLAN is called an access node of the VLAN.

Referring to FIG. 1A, a processing flow of a method for instructing nodes of an Ethernet ring network system to flush addresses by the master node according to an embodiment of the present invention is shown.

Step 101: Receive a failure message from a node connected to at least one of two ends of a failed link on the Ethernet ring network.

Step 102: Determine, according to the failure message, a specific VLAN affected by the failure.

Step 103: Send an instruction message for flushing a MAC address forwarding table to at least one node of the Ethernet ring network, where the instruction message carries an identifier of the specific VLAN, so that a specific node accessed by the specific VLAN deletes addresses related to the specific VLAN.

In the embodiment of the present invention, each node at both ends of the failed link can send the node identifiers of the two nodes at both ends of the failed link to the master node. That is, the master node can obtain the node identifiers of the two nodes carried in the failure message by using the failure message of only one node. In this case, each node is required to maintain the node identifiers of its adjacent nodes. As an example, each node records node identifiers of other nodes in the link connected to the node. For example, each node records a corresponding relationship between a link identifier and node identifiers, where the link identifier may be represented by a physical channel identifier and/or a logical channel identifier. The physical channel identifier includes, but is not limited to, a port identifier and the logical channel identifier includes, but is not limited to, a VID. The master node may also receive failure messages from two nodes, where each failure message, carries the node identifiers of the two nodes. Optionally, the master node may perform verification by using the node identifiers sent from the two nodes to judge whether there is an error report. For example, the master node compares the node identifiers reported by the two nodes to see whether they are consistent, and if they are not consistent, it indicates that at least one node makes an error report; if they are consistent, it indicates that correct reports are made. In case of the error report, the master node starts a flow of relocating the failure.

Figure 1B:
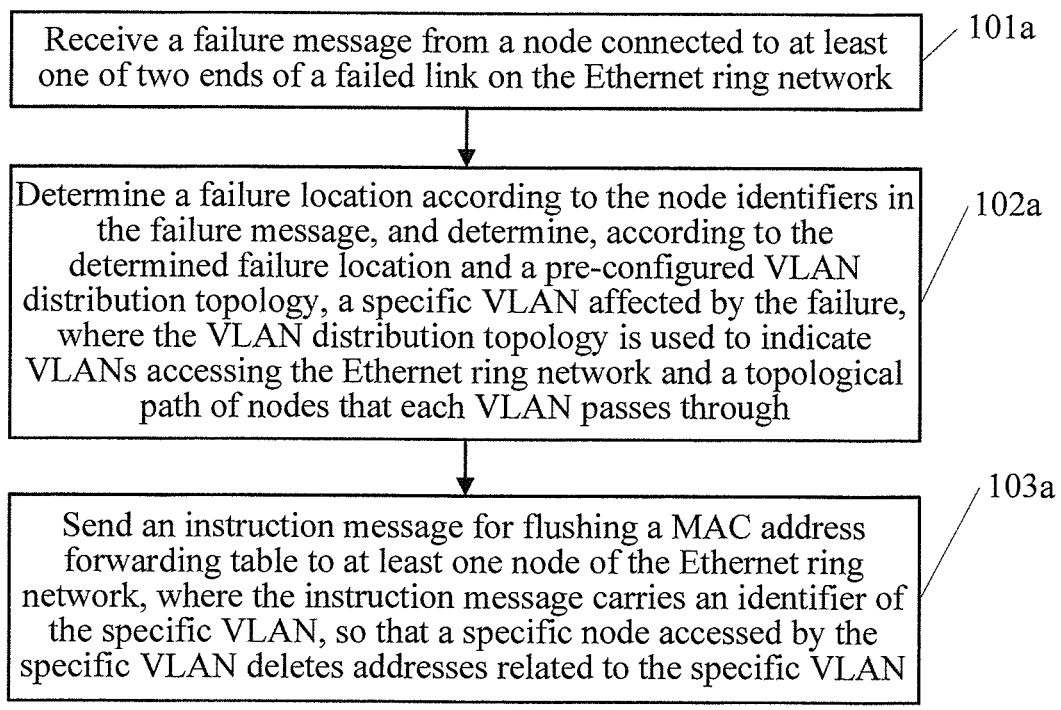

Referring to FIG. 1B, the embodiment provided in FIG. 1A is illustrated in further detail. The following steps are specifically included.

Step 101a: Receive a failure message from a node connected to at least one of two ends of a failed link on the Ethernet ring network, where the failure message carries node identifiers.

Step 102a: Determine a failure location according to the node identifiers in the failure message, and determine, according to the determined failure location and a pre-configured VLAN distribution topology, a specific VLAN affected by the failure, where the VLAN distribution topology is used to indicate VLANs accessing the Ethernet ring network and a topological path of nodes that each VLAN passes through.

Step 103a: Send an instruction message for flushing a MAC address forwarding table to at least one node of the Ethernet ring network, where the instruction message carries an identifier of the specific VLAN, so that a specific node accessed by the specific VLAN deletes addresses related to the specific VLAN.

The node identifiers in all embodiments of the present invention may be the MAC addresses of nodes, or the device identifiers of the nodes, or the physical location identifiers or logical location identifiers of the nodes on the Ethernet ring network. The physical location identifier of a node on the Ethernet ring network may be represented by a combination of a device physical identifier and a port identifier.

Specifically, the master node can maintain the VLAN distribution topology of the Ethernet ring network. For example, the master node can maintain a VLAN distribution topology table, where the VLAN distribution topology table records a corresponding relationship between an identifier of a VLAN (VID) and the topological path of nodes that the VLAN passes through. Optionally, the VLAN distribution topology table may also record information of access nodes of the VLANs on the Ethernet ring network. As shown in Table 1, the node identifiers, for example, are the MAC addresses of the nodes in Table 1.

TABLE 1

| VID | Node | Topology |
| --- | --- | --- |
| 40 | MAC 601 MAC 602 MAC 604 | MAC 601 MAC 602 MAC 603 MAC 604 |
| 36 | MAC 603 MAC 606 | MAC 603 MAC 604 MAC 605 MAC 606 |
| 56 | MAC 605 MAC 606 | MAC 605 MAC 606 |

Figure 6:
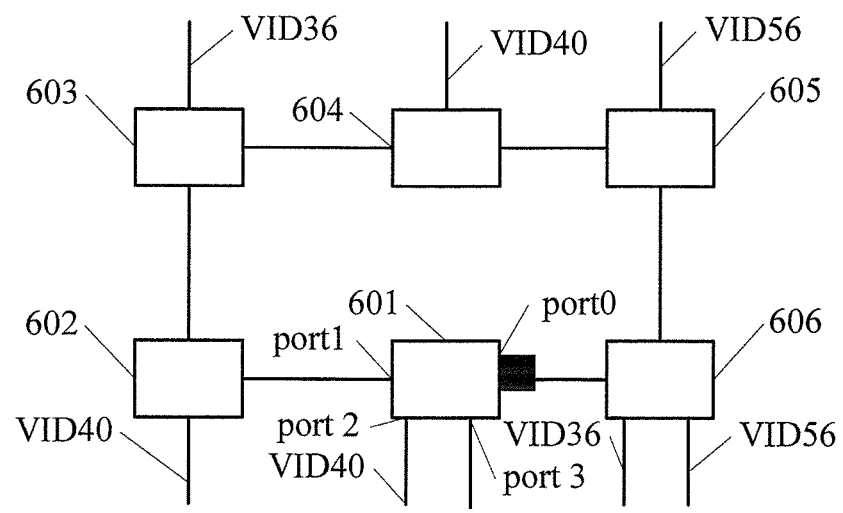
FIG. 6 is a topology structural diagram of an instance of an Ethernet ring network system in a normal state.

As shown in FIG. 6, in the above VLAN distribution topology table, MAC 601, MAC 602, . . . , and MAC 606 refer to the MAC addresses of the node 601, node 602, ..., and node 606 respectively. The entry VID refers to the VLAN identifier. The entry Node refers to an access node of a VLAN on the Ethernet ring network. Each Node entry corresponds to a VID, indicating a node accessed by a VLAN identified by the VID. As shown in the above table, access nodes of the VLAN 40 identified by the VID 40 on the Ethernet ring network are the node 601, node 602, and node 604, which are identified by using the MAC 601, MAC 602, and MAC 604 respectively; access nodes of the VLAN 36 identified by the VID 36 are the node 603 and node 606, which are identified by using the MAC 603 and MAC 606 respectively. The entry Topology refers to a topological path, and each Topology entry corresponds to a VID, indicating a topological path of nodes that a VLAN identified by the VID on the Ethernet ring network passes through. As shown in the above table, the topological path of the VLAN 40 is: node 601→node 602→node 603→node 604, represented by the MAC 601, MAC 602, MAC 603, and MAC 604. The entry Node is optional, and will be described in detail in the following.

When the failure location is determined to be the link between the node 601 and the node 602, the VLAN distribution topology table is queried according to the node identifiers of the node 601 and the node 602. When it is determined that the VID 40 is affected, the topological path needs to be changed. Specifically, the distribution topology of the VLAN 40 may be updated as: node 601→node 606→node 605→node 604→node 603→node 602, as shown in Table 2.

TABLE 2

| VID | Node | Topology |
|---|---|---|
| 40 | MAC 601 MAC 2 MAC 4 | MAC 601 MAC 606 MAC 605 MAC 604 MAC 603 MAC 602 |
| 36 | MAC 603 MAC 606 | MAC 603 MAC 604 MAC 605 MAC 606 |
| 56 | MAC 605 MAC 606 | MAC 605 MAC 606 |

In the above embodiment, the node 601 is the master node. As shown in FIG. 6, if the node 601 determines that the node 601 is one of the nodes of the affected VLAN 40, the node 601 deletes forwarding addresses related to the VLAN 40 in the MAC address forwarding table stored on the node 601.

If the specific VLAN affected by the failure is determined to be the VLAN 40, in step 103, the master node sends an instruction message for flushing the MAC address forwarding table to access nodes of the VLAN 40 on the Ethernet ring network, that is, the nodes 602 and 604, where the instruction message carries the VID 40.

The master node sends an instruction message for flushing a MAC address forwarding table to nodes on the Ethernet ring in broadcast or multicast mode, where the instruction message carries the VID 40, so that the nodes 602 and 604 can identify and delete addresses related to the VID 40 in the MAC address forwarding table.

Preferably, the master node may obtain addresses of access nodes of the VLAN 40, for example, obtain the MAC addresses of specific nodes (nodes 602 and 604) accessed by the VLAN 40 according to the mapping relationship between the VID and the nodes stored on the master node, and send, by using the MAC addresses of the specific nodes as the destination addresses, an instruction message for flushing the MAC address forwarding table to the specific nodes in unicast mode, where the instruction message carries the VID 40.

In all embodiments of the present invention, the master node may be a border node connected to other networks, for example, a border node connected to a convergence network or a metropolitan area network. When the master node is used as a border node, the master node can be connected to an access gateway, for example, a broadband remote access server. As shown in FIG. 6, the non-ring port of the node 601, namely, port 3, is connected to the broadband remote access server. The master node may also be connected to a user equipment in addition to other nodes on the Ethernet ring network.

In the above embodiment, the master node determines the failure location by analyzing and judging the failure message, determines, according to the failure location and the VLAN distribution topology, a specific VLAN that is affected, and sends an instruction message for flushing the MAC address forwarding table to a node accessed by the specific VLAN, where the instruction message carries the identifier of the specific VLAN. In this way, the deletion of MAC address forwarding entries is confined to a specified node and a specified VLAN, which greatly reduces the number of deleted MAC address forwarding entries, shortens the time of deletion, and reduces the time of re-learning the MAC addresses, thereby greatly reducing the service interruption time and implementing fast recovery of services. In an exemplary embodiment of the present invention, the master node uses the MAC addresses of specific nodes accessed by the specific VLAN as the destination addresses of the instruction message for flushing the MAC address forwarding table, and sends the instruction message for flushing the MAC address forwarding table to the specific nodes in unicast mode; intermediate nodes not accessed by the specific VLAN on the Ethernet ring network do not need to further execute the step of flushing the MAC address forwarding table, and only nodes whose MAC addresses are equal to the destination MAC addresses execute the step of flushing the MAC address forwarding table. In this way, the service recovery time may be shortened.

Figure 1C:
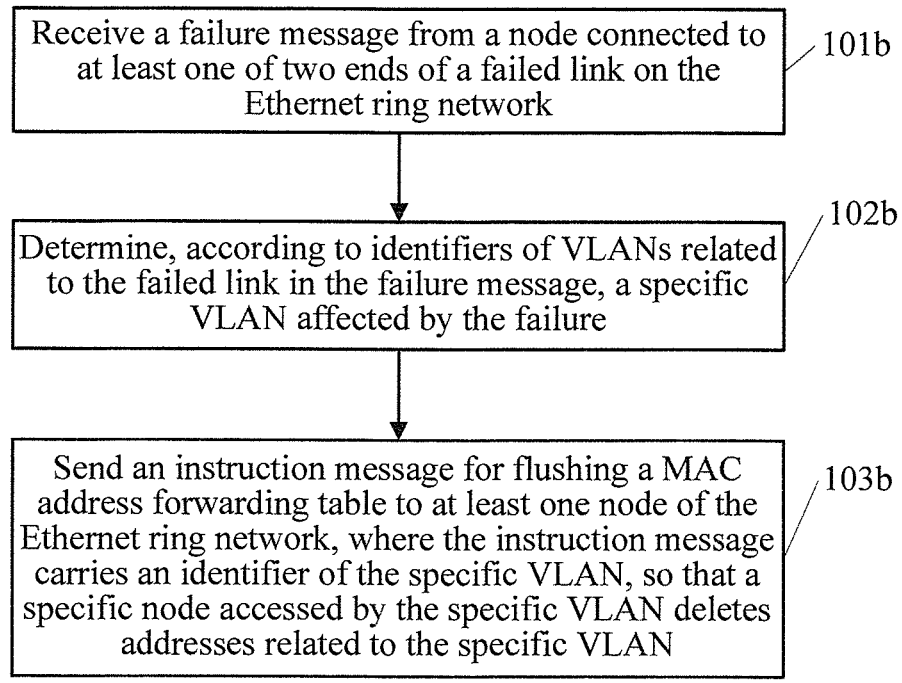

Referring to FIG. 1C, the embodiment provided in FIG. 1A is illustrated in further detail. Step 103*b* in FIG. 1C is the same as step 103 in FIG. 1A. Specially, the failure message in step 101*b* carries identifiers of VLANs (VIDs) to which a failed link belongs. In this way, in step 102*b*, the master node may determine, according to the VIDs carried in the failure message, that VLANs corresponding to the VIDs are affected by the failure. The master node carries these VIDs in an instruction message for flushing the MAC address forwarding table, and sends the instruction message to nodes on the Ethernet ring network in broadcast mode, so that nodes accessed by the VLANs corresponding to the VIDs can identify that the instruction message is sent to them and flush addresses related to the VLANs corresponding to the VIDs. The master node may also send the instruction message for flushing the MAC address forwarding table, which carries the VIDs, to destination nodes in unicast mode. If the unicast mode is used, the master node is required to obtain the MAC addresses of the destination nodes. For example, according to the mapping relationship between the VIDs and nodes stored on the master node, the master node obtains MAC addresses of specific nodes (nodes 602 and 604) accessed by the VLAN 40, and uses the MAC addresses of the specific nodes as the destination addresses of the instruction message.

Figure 2A:
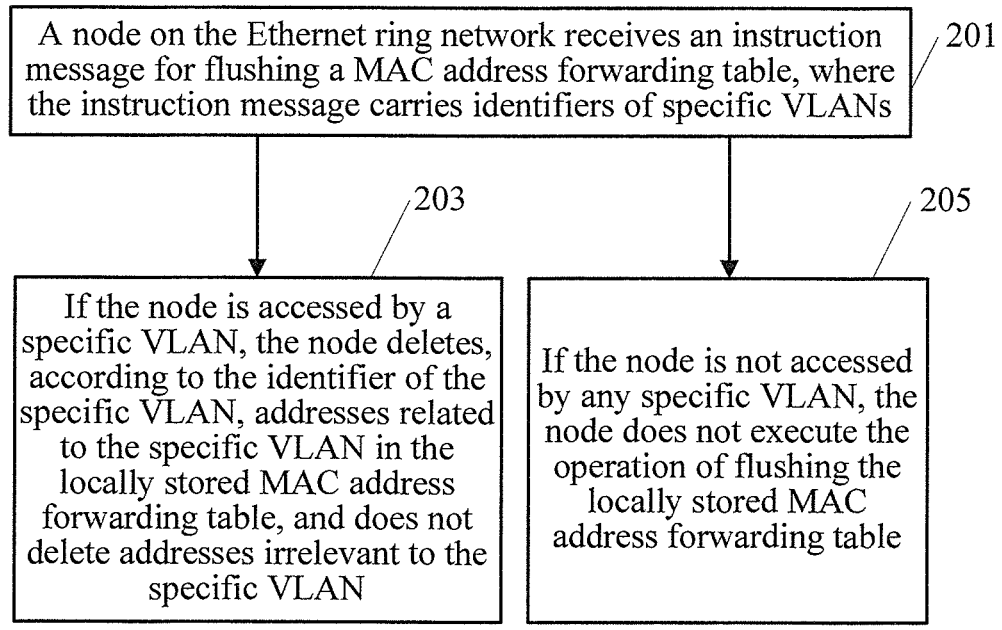
FIG. 2A is a flowchart of a method for flushing addresses by nodes on an Ethernet ring network.

Referring to FIG. 2A, a flow of a method for flushing addresses by nodes on the Ethernet ring network according to an embodiment of the present invention is shown. This embodiment intends to describe a process performed by nodes on the Ethernet ring network after the nodes receive an instruction message for flushing a MAC address forwarding table.

Each node on the Ethernet ring network may learn MAC addresses and records the learned MAC addresses into the MAC address forwarding table. The MAC address forwarding table records a corresponding relationship between VIDs, destination MAC addresses, and forwarding egress port numbers of the local node, where the corresponding relationship may be used to forward services based on the VIDs and the MAC addresses, that is, a forwarding egress port is obtained by query using the combination of the VID and the MAC address as an index. The MAC address forwarding table records MAC addresses of access nodes other than the local node among all the access nodes of the specific VLAN on the Ethernet ring network and MAC addresses of all user equipments accessed by the specific VLAN.

Step 201: A node on the Ethernet ring network receives an instruction message for flushing a MAC address forwarding table, where the instruction message carries identifiers of specific VLANs whose MAC address forwarding entries need to be flushed. These identifiers of specific VLANs indicate VLANs affected by the failure.

Step 203: If the node is accessed by a specific VLAN, the node deletes, according to the identifier of the specific VLAN, addresses related to the specific VLAN in the locally stored MAC address forwarding table, and does not delete addresses irrelevant to the specific VLAN.

Step 205: If the node is not accessed by any specific VLAN, the node does not execute the operation of flushing the locally stored MAC address forwarding table.

In step 201, after the node receives the instruction message, the node may judge, according to the identifier of the specific VLAN in the instruction message, whether the specific VLAN accesses the local node or whether the local node is an access node of the specific VLAN to choose to execute step 203 or step 205. In addition, if the instruction message is a unicast packet, the node may determine whether to choose step 203 or step 205 directly according to whether the destination MAC address of the unicast packet matches the MAC address of the local node, and if they match, the node chooses to execute step 203, and if they do not match, the node chooses to execute step 205.

For the access node of the specific VLAN, because the function of learning forwarding addresses of the specific VLAN is enabled, the node can learn new forwarding addresses related to the specific VLAN after the addresses related to the specific VLAN are deleted.

Table 3 shows an instance of the MAC address forwarding table.

TABLE 3

| VID | MAC-address | Port |
|---|---|---|
| 40 | User MAC 1 | 0 |
| 40 | MAC 601 | 1 |
| 40 | MAC 605 | 1 |
| 36 | User MAC 2 | 0 |
| 36 | MAC 606 | 2 |

In Table 3, the VID entry (VID) refers to the VLAN identifier, the MAC address entry (MAC-address) refers to the MAC addresses that the local node learns in each VLAN, and the egress port entry (Port) refers to the forwarding egress port number of the local node. Ports numbered 1 and 2 refer to ring ports. Each ring port is used to connect other nodes on the Ethernet ring network.

For example, if the VID carried in the received instruction message for flushing the MAC address forwarding table is 40, only the MAC address entries and the egress port entries corresponding to the VID 40 are deleted, as shown in Table 4.

TABLE 4

| VID | MAC-address | Port |
|---|---|---|
| 40 | | |
| 40 | | |
| 40 | | |
| 36 | User MAC 2 | 0 |
| 36 | MAC 606 | 2 |

Preferably, only the addresses related to the VID 40 and the egress ports that are ring ports in the MAC address forwarding table need to be deleted. For example, only the MAC addresses and egress port addresses where the VID is 40 and egress port numbers are 1 and 2 are deleted, as shown in Table 5.

TABLE 5

| VID | MAC-address | Port |
|---|---|---|
| 40 | User MAC 1 | 0 |
| 40 | | |
| 40 | | |
| 36 | User MAC 2 | 0 |
| 36 | MAC 606 | 2 |

In the above embodiment, the instruction message for flushing the MAC address forwarding table, which is transmitted on the Ethernet ring network, carries an identifier of a specific VLAN whose address entries need to be flushed; nodes accessed by the specific VLAN flush addresses related to the specific VLAN in the MAC address forwarding table, while nodes not accessed by the specific VLAN do not execute the operation of flushing the address forwarding table. In this way, it is ensured that with the nodes accessed by the specific VLAN, the flushing of the MAC address forwarding table is directly confined to specified nodes and a specified VLAN, which greatly reduces the consumed time of flushing the MAC address forwarding table and reduces the time of re-learning the MAC addresses, thereby greatly reducing the service interruption time and implementing fast recovery of services. In addition, after nodes not accessed by the specific VLAN receive the instruction message, the nodes do not execute the operation of flushing the MAC address forwarding table, thereby not affecting the services. In an exemplary embodiment of the present invention, nodes accessed by the specific VLAN delete only the MAC address forwarding entries where the egress ports are ring ports in the corresponding VLAN. In this way, the deletion of the MAC address forwarding entries is confined to a specified egress port, which further reduces the time of deleting the MAC address forwarding entries and speeds up the service recovery.

Figure 2B:
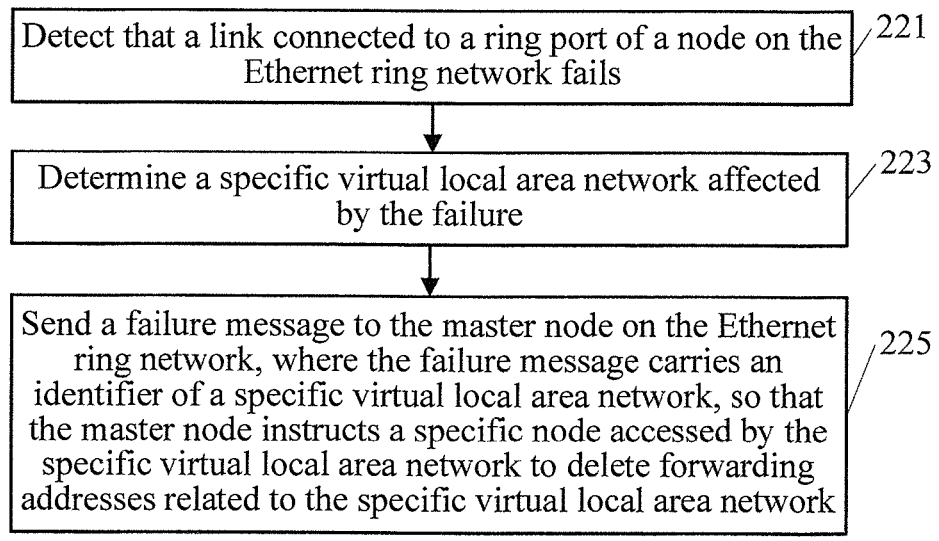
FIG. 2B is a flowchart of a method for instructing nodes on an Ethernet ring network to flush addresses.

Referring to FIG. 2B, another embodiment of a method for instructing nodes on an Ethernet ring network to flush addresses according to an embodiment of the present invention is shown. This embodiment intends to describe a process performed after a node on the Ethernet ring network detects a link failure to implement protection on the Ethernet ring network.

Step 221: Detect that a link connected to a ring port of a node on the Ethernet ring network fails.

Step 223: Determine a specific VLAN affected by the failure.

Step 225: Send a failure message to the master node on the Ethernet ring network, where the failure message carries an identifier of a specific VLAN, so that the master node instructs a specific node accessed by the specific VLAN to delete addresses related to the specific VLAN.

Further, after detecting that a link fails, the node obtains the identifier of the failed link and queries a corresponding relationship between link identifiers and VLAN identifiers according to the identifier of the failed link to obtain identifiers of VLANs to which the failed link belongs, where the corresponding relationship is used to indicate each link and VLANs to which the link belongs.

Figure 3A:
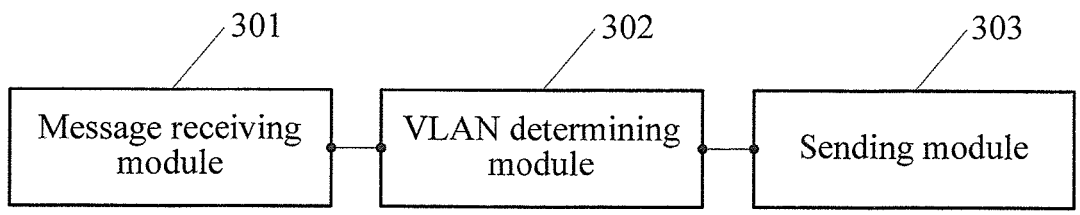
FIGS. 3A to 3C are logical structural diagrams of an Ethernet node device.

Referring to FIG. 3A, a first embodiment of an Ethernet node device according to an embodiment of the present invention is shown. This embodiment corresponds to the method shown in FIG. 1A. The Ethernet node device includes:

a message receiving module 301, configured to receive a failure message from a node connected to at least one of two ends of a failed link on the Ethernet ring network;

a VLAN determining module 302, configured to determine, according to the failure message, a specific VLAN affected by the failure; and a sending module 303, configured to send an instruction message for flushing a MAC address forwarding table to at least one node on the Ethernet ring network, where the instruction message carries an identifier of the specific VLAN, so that a specific node accessed by the specific VLAN flushes addresses related to the specific VLAN.

Figure 3B:
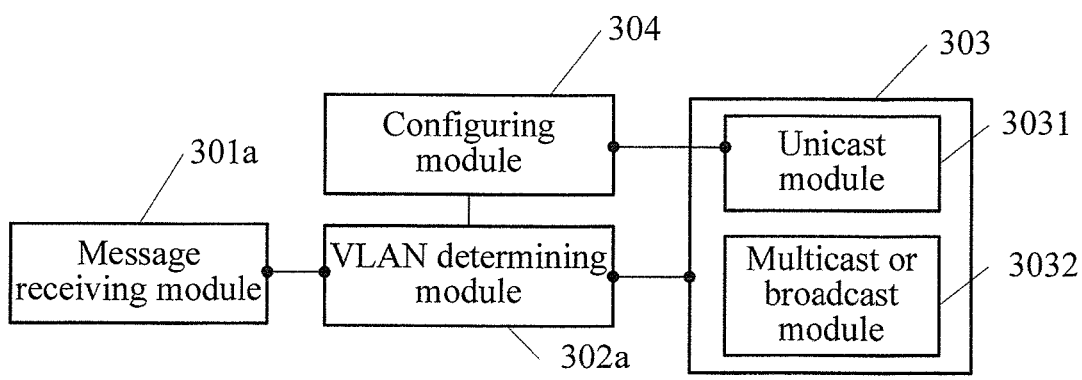

Referring to FIG. 3B, a second embodiment of an Ethernet node device according to an embodiment of the present invention is shown. This embodiment corresponds to the method shown in FIG. 13. The Ethernet node device includes a message receiving module 301a, a configuring module 304, a VLAN determining module 302a, and a sending module 303.

The message receiving module 301a is configured to receive a failure message from a node connected to at least one of two ends of a failed link on the Ethernet ring network. Specially, the message receiving module 301a may receive failure messages from two nodes at both ends of the failed link, where each failure message carries node identifiers of the sending nodes. The message receiving module 301a may also receive a failure message from a node connected to at least one of two ends of the failed link, where each failure message carries node identifiers of the nodes at both ends of the failed link.

The configuring module 304 is configured to configure a VLAN topology, where the VLAN topology is used to describe a path of Ethernet ring network node devices that each VLAN passes through and may be configured according to the modes shown in Table 1 and Table 2.

The VLAN determining module 302a is configured to determine, a failure location according to the node identifiers carried in the failure message, and query the configured VLAN topology according to the determined failure location so as to determine a specific VLAN affected by the failure.

The sending module 303 is configured to send an instruction message for flushing a MAC address forwarding table to at least one node on the Ethernet ring network, where the instruction message carries an identifier of the specific VLAN, so that a specific node accessed by the specific VLAN flushes addresses related to the specific VLAN.

Specially, the sending module 303 may include a unicast module 3031 and a multicast or broadcast module 3032. The unicast module 3031 obtains a destination address of the instruction message, where the destination address may be obtained from the configuring module 304. For example, if the configuring module 304 performs configuration according to the mode shown in Table 1, the address in the Node entry corresponding to the specific VLAN in Table 1 may be used as a destination address and provided for the unicast module 3031. The multicast or broadcast module 3032 may be a VLAN forwarding module.

Figure 3C:
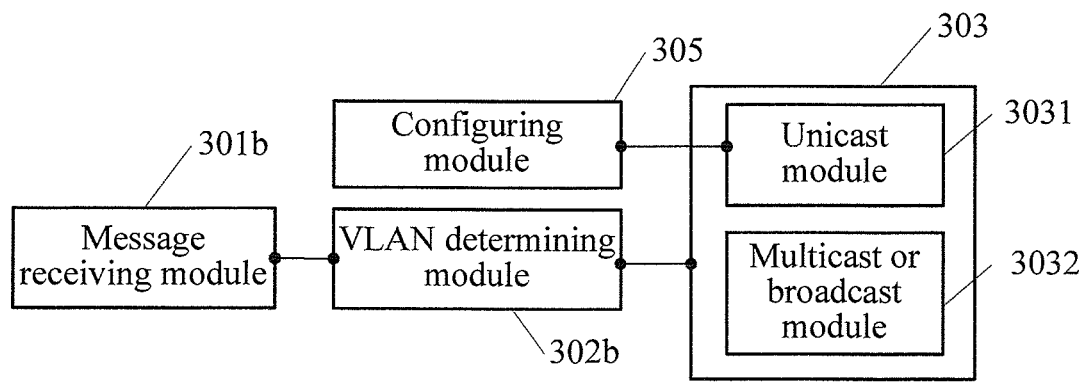

Referring to FIG. 3C, a third embodiment of an Ethernet node device according to an embodiment of the present invention is shown. This embodiment corresponds to the method shown in FIG. 1C. The Ethernet node device includes:

a message receiving module 301b, configured to receive a failure message from a node connected to at least one of two ends of a failed link on the Ethernet ring network, where the failure message carries identifiers of VLANs to which the failed link belongs;

a VLAN determining module 302b, configured to determine, according to the node identifiers carried in the failure message, a specific VLAN affected by the failure; and a sending module 303, configured to send an instruction message for flushing a MAC address forwarding table to at least one node on the Ethernet ring network, where the instruction message carries an identifier of the specific VLAN, so that a specific node accessed by the specific VLAN flushes addresses related to the specific VLAN.

Similarly, the sending module 303 may include a unicast module 3031 and a multicast or broadcast module 3032. The unicast module 3031 obtains a destination address of the instruction message, where the destination address may be obtained from a configuring module 305. For example, the configuring module 305 configures a corresponding relationship between VLANs and nodes, where each VLAN in the corresponding relationship corresponds to a node accessed by the VLAN. In the configuring module 305, VLANs are represented by VIDs, and nodes are represented by node identifiers, for example, MAC addresses of the nodes.

Figure 4:
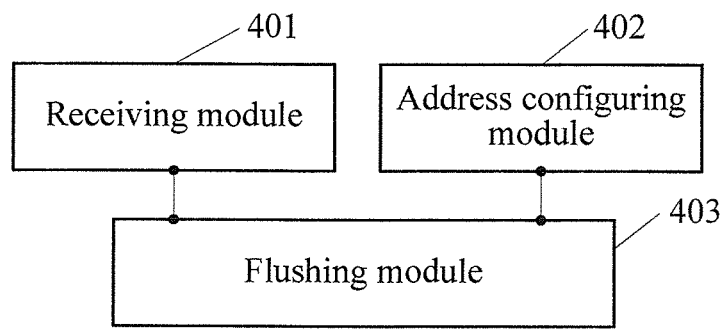
FIG. 4 is a logical structural diagram of an Ethernet node device.

Referring to FIG. 4, a fourth embodiment of an Ethernet node device according to an embodiment of the present invention includes:

a receiving module 401, configured to receive an instruction message for flushing a MAC address forwarding table, where the instruction message carries an identifier of a specific VLAN affected by a failure;

an address configuring module 402, configured to learn MAC addresses and configure the learned MAC addresses into the MAC address forwarding table, where the MAC address forwarding table records a corresponding relationship between VLAN identifiers, MAC addresses, and egress port addresses, and each VLAN identifier corresponds to at least one MAC address and at least one egress port address; and a flushing module 403, configured to delete, according to the identifier of the specific VLAN affected by the failure carried in the instruction message, addresses related to the identifier of the specific VLAN in the MAC address forwarding table, and not delete addresses irrelevant to the identifier of the specific VLAN. Preferably, the flushing module 403 may delete, according to the identifier of the specific VLAN affected by the failure carried in the instruction message, entries where the egress ports are ring ports in the corresponding VLAN.

Figure 5:
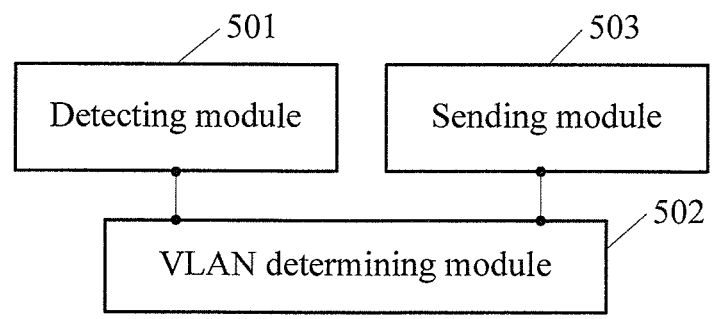
FIG. 5 is a logical structural diagram of an Ethernet node device.

Referring to FIG. 5, a fifth embodiment of an Ethernet node device according to an embodiment of the present invention includes:

a detecting module 501, configured to detect that a link connected to a ring port of a node on the Ethernet ring network fails;

a VLAN determining module 502, configured to determine a specific VLAN affected by the failure; and a sending module 503, configured to send a failure message to a master node on the Ethernet ring network, where the failure message carries an identifier of the specific VLAN, so that the master node instructs a specific node accessed by the specific VLAN to delete addresses related to the specific VLAN.

The VLAN determining module 502 may obtain the identifier of the failed link, and query, according to the identifier of the failed link, a locally configured corresponding relationship between link identifiers and VLAN identifiers to obtain VLAN identifiers corresponding to the identifier of the failed link, where the corresponding relationship is used to indicate VLANs to which each link belongs. The link identifier can be seen in the foregoing descriptions, and is not further described.

Figure 7:
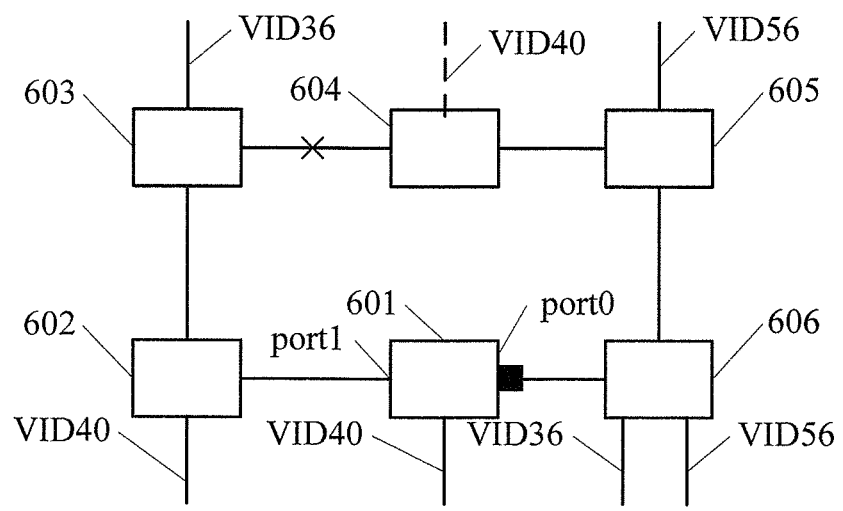
FIG. 7 is a topology structural diagram of an instance of an Ethernet ring network system in a failure.

The following describes the solution in detail with an application instance with reference to FIG. 6 and FIG. 7.

FIG. 6 illustrates an Ethernet ring network system. The Ethernet ring network system includes multiple nodes, for example, nodes 601, 602, 603, 604, 605, and 606, where the node 601 is the master node, each node is connected, to adjacent nodes through respective ring ports, and a non-ring port of at least one node is accessed by a VLAN.

In the following application instance, nodes whose non-ring ports are accessed by VLANs are collectively called access nodes. Each node learns MAC addresses only for a VLAN accessing the local node. If a node is not the access node of the VLAN, the node does not learn the MAC addresses, that is, disables the function of learning the MAC addresses for the VLAN. As indicated by the black box shown in FIG. 6, the port 0 of the node 601 blocks the VLAN service, that is, after the port 0 receives service data, it discards the service data.

In FIG. 6, the access nodes of the VID 40 are nodes 602, 604, and 601, the distribution topology of the VID 40 is: 601→602→603→604, and nodes 603, 605, and 606 disable the function of learning the MAC addresses for the VID 40; the access nodes of the VID 36 are nodes 603 and 606, the distribution topology of the VID 36 is: 603→604→605→606, and nodes 601, 602, 604, and 605 disable the function of learning the MAC addresses for the VID 36; the access nodes of the VID 56 are nodes 605 and 606, the distribution topology of the VID 56 is: 605→606, and nodes 601, 602, 603, and 604 disable the function of learning the MAC addresses for the VID 56. The configured VLAN distribution topology table is shown in Table 6. The VID values in Table 6 represent the identifiers of VLANs (VIDs) accessing the Ethernet ring network. Values of the Node entry represent node identifiers of the access nodes, and can be represented by the MAC addresses shown in Table 1, which can be represented by values reflecting the uniqueness of the nodes on the Ethernet ring network. Details can be seen in the foregoing text and is not further described. The values of the Topology entry represent topological paths of nodes related to the VID on the Ethernet ring network.

TABLE 6

| VID | Node | Topology |
|---|---|---|
| 40 | 602 604 601 | 601 602 603 604 |
| 36 | 603 606 | 603 604 605 606 |
| 56 | 605 606 | 605 606 |

As shown in FIG. 7, when the link between a right port of the node 603 and a left port of the node 604 fails, after detecting the link failure, the node 603 and the node 604 send a failure message to the node 601. After receiving the failure message, the node 601 judges, according to source MAC addresses in the failure message, that is, the MAC address of the node 603 and the MAC address of the node 604, that the link between the node 603 and the node 604 fails.

After determining the failure location, the node 601 queries the VLAN distribution topology table and determines the paths of which VLANs pass through the link between the node 603 and the node 604 to know the VLANs affected by the failure. Specifically, if the node 601 finds, by using the MAC addresses of the node 603 and the node 604, that the topological path of the VID 40 and the topological path of the VID 36 pass through the link between the node 603 and the node 604, the topological paths of the VID 40 and the VID 36 need to be changed. The node 601 obtains, from the VLAN distribution topology, the VID 40 whose topological path passes through the node 603 and the node 604 and MAC addresses of corresponding access nodes (MAC addresses of the nodes 602, 604, and 601), and the VID 36 and MAC addresses of corresponding access nodes (MAC addresses of the nodes 603 and 606). In this case, the node 601 flushes the topological paths of the VID 40 and the VID 36 in the locally stored VLAN distribution topology, opens the blocked port 0, and sends an instruction message for flushing a MAC address forwarding table to the access nodes 602 and 604 of the VID 40 in unicast mode, where the instruction message includes the VID 40, and sends an instruction message for flushing a MAC address forwarding table to the access nodes 603 and 606 of the VID 36, where the instruction message for flushing the MAC address forwarding table includes the VID 36.

The node 601 maintains the distribution topology of VLANs allowed to access the Ethernet ring network, and updates the VLAN distribution topology table. Table 7 shows the updated VLAN distribution topology table.

TABLE 7

| VLAN ID | Node | Topology |
|---|---|---|
| 40 | 602 604 601 | 604 605 606 601 602 |
| 36 | 603 606 | 606 605 602 603 |
| 56 | 605 606 | 605 606 |

After receiving the instruction message for flushing the MAC address forwarding table, the nodes 602, 604, and 601 delete, according to the VID 40 information in the instruction message for flushing the MAC address forwarding table, addresses related to the VID 40, the MAC address forwarding entries where the egress ports are ring ports in the present invention; after receiving the instruction message for flushing the MAC address forwarding table, the nodes 603 and 606 delete, according to the VID 36 information in the instruction message for flushing the MAC address forwarding table, addresses related to the VID 36, the MAC address forwarding entries where the egress ports are ring ports. In this application instance, the nodes 602, 604, and 601 may delete only the egress port entry values where the egress ports are ring ports corresponding to the VID 40, and the nodes 603 and 606 may delete only the egress port entries where the egress ports are ring ports corresponding to the VID 36.

Taking the node 606 as an example, the MAC address forwarding table before the node 606 deletes the entries is shown in Table 8.

TABLE 8

| VID | MAC-address | Port |
|---|---|---|
| 36 | User MAC 1 | 0 |
| 36 | User MAC 2 | 0 |

TABLE 8-continued

| VID | MAC-address | Port |
|---|---|---|
| 36 | 603 | 1 |
| 56 | User MAC 3 | 0 |
| 56 | User MAC 4 | 1 |
| 56 | 605 | 1 |

The MAC address forwarding table after the node 606 deletes the entries is shown in Table 9.

TABLE 9

| VID | MAC-address | Port |
|---|---|---|
| 36 | User MAC 1 | 0 |
| 36 | User MAC 2 | 0 |
| 36 | 603 | |
| 56 | User MAC 3 | 0 |
| 56 | User MAC 4 | 0 |
| 56 | 605 | |

Because the node 601 per se is the access node of the VID 40, when determining that the local node is the access node of the VID 40, the node 601 deletes a specific egress port address of the VID 40, where the specific egress port address indicates that the egress port is a ring port.

It is understandable by persons of ordinary skill in the art that all or part of steps of the methods in the above embodiments may be implemented by related hardware instructed by a program. The program may be stored in a computer readable storage medium. The storage medium may include a read only memory (ROM, Read Only Memory), a random access memory (RAM, Random Access Memory), a magnetic disk, or an optical disk. The method for instructing nodes on the Ethernet ring network to flush addresses according to the above embodiments, may be implemented by one or more processors by executing a program to instruct related hardware. The method for flushing addresses according to the above embodiments may also be implemented by one or more processors by executing a program to instruct related hardware.

Detailed above are the method, system, and device for managing addresses on the Ethernet ring network according to the embodiments of the present invention. The principle and implementation of the present invention are described through specific examples, but these embodiments are only used to help understand the method and core idea of the present invention. Persons of ordinary skill in the art can make various modifications and variations to the specific implementation and application scope without departing from the idea of the invention. In conclusion, the specification should not be construed as a limitation on the present invention.

What is claimed is:

1. A method for instructing nodes on an Ethernet ring network to flush addresses, wherein the Ethernet ring network comprises multiple nodes, each node comprises ring ports used to connect adjacent nodes, and at least one node comprises a non-ring port used to access a virtual local area network, the method comprising:

receiving a failure message from a node connected to at least one of two ends of a failed link on the Ethernet ring network;

determining a failure location according to node identifiers carried in the failure message, and determining, according to the determined failure location and a pre-configured virtual local area network distribution topology, a specific virtual local area network affected by the failure on the Ethernet ring network, wherein the virtual local area network distribution topology is used to indicate virtual local area networks accessing the Ethernet ring network and a topological path of nodes that each virtual local area network passes through; and sending an instruction message for flushing a media access control address forwarding table to a specific node accessed by the specific virtual local area network on the Ethernet ring network, wherein the instruction message carries an identifier of the specific virtual local area network, so that the specific node deletes addresses related to the specific virtual local area network.

2. The method according to claim 1, wherein after the step of determining, according to the determined failure location and the virtual local area network distribution topology, the specific virtual local area network affected by the failure, the method further comprises:

updating a distribution topology of the specific virtual local area network in the pre-configured distribution topology of the virtual local area networks accessing the Ethernet ring network.

3. The method according to claim 2, wherein the step of sending an instruction message for flushing a media access control address forwarding table to a specific node accessed by the specific virtual local area network on the Ethernet ring network comprises:

obtaining an address of the specific node, using the address of the specific node as a destination address of the instruction message for flushing the media access control address forwarding table, and sending the instruction message for flushing the media access control address forwarding table to the specific node in unicast mode.

4. The method according to claim 1, wherein the step of sending an instruction message for flushing a media access control address forwarding table to a specific node accessed by the specific virtual local area network on the Ethernet ring network comprises:

obtaining an address of the specific node, using the address of the specific node as a destination address of the instruction message for flushing the media access control address forwarding table, and sending the instruction message for flushing the media access control address forwarding table to the specific node in unicast mode.

5. A method for instructing a node on an Ethernet ring network to flush addresses, wherein the Ethernet ring network comprises multiple nodes, each node comprises ring ports used to connect adjacent nodes, and at least one node comprises a non-ring port used to access a virtual local area network, the method comprising:

receiving a failure message from a node connected to at least one of two ends of a failed link on the Ethernet ring network;

determining, according to the failure message, a specific virtual local area network affected by the failure on the Ethernet ring network; and obtaining an address of a specific node, using the address of the specific node as a destination address of an instruction message for flushing a media access control address forwarding table, and sending the instruction message for flushing the media access control address forwarding table to the specific node accessed by the specific virtual local area network on the Ethernet ring network in unicast mode, wherein the instruction message carries an identifier of the specific virtual local area network, so that the specific node deletes addresses related to the specific virtual local area network.

6. The method according to claim 1, wherein the step of sending an instruction message for flushing a media access control address forwarding table to a specific node accessed by the specific virtual local area network on the Ethernet ring network comprises:

obtaining an address of the specific node, using the address of the specific node as a destination address of the instruction message for flushing the media access control address forwarding table, and sending the instruction message for flushing the media access control address forwarding table to the specific node in unicast mode.

7. An Ethernet node device, comprising:

a message receiving module, configured to receive a failure message from a node connected to at least one of two ends of a failed link on an Ethernet ring network;

a virtual local area network determining module, configured to determine, according to the failure message, a specific virtual local area network affected by the failure;

a sending module, configured to send an instruction message for flushing a MAC address forwarding table to at least one node on the Ethernet ring network, wherein the instruction message carries an identifier of the specific virtual local area network, so that a specific node accessed by the specific virtual local area network flushes addresses related to the specific virtual local area network;

a configuring module, configured to configure a virtual local area network topology, wherein the virtual local area network topology is used to indicate virtual local area networks accessing the Ethernet ring network and a path of devices nodes that each virtual local area network passes through; and wherein the virtual local area network determining module is configured to determine a failure location according to node identifiers carried in the failure message, and query the virtual local area network topology according to the determined failure location to determine the specific virtual local area network affected by the failure.

8. The device according to claim 7, wherein the instruction message for flushing the MAC address forwarding table includes a destination address that is an address of the specific node such that the instruction message for flushing the MAC address forwarding table can be sent to the specific node in unicast mode.

9. An Ethernet ring network system, wherein the Ethernet ring network system comprises multiple nodes connected into a ring, each node is connected to adjacent nodes through respective ring ports, and at least one node has a non-ring port for accessing a virtual local area network, comprising:

a first node, configured to detect that a link connected to a ring port of the first node fails, and send a failure message to a second node in the Ethernet ring network system;

the second node, configured to determine, according to the failure message, a specific virtual local area network affected by the failure in the Ethernet ring network system, and send an instruction message for flushing a media access control address table to at least one node in the Ethernet ring network system, wherein the instruction message carries an identifier of the specific virtual local area network;

a node accessed by the specific virtual local area network, configured to receive the instruction message, delete, according to the identifier of the specific virtual local area network in the instruction message, addresses related to the specific virtual local area network in the locally stored media access control address table, and not delete addresses irrelevant to the specific virtual local area network; and wherein the second node determines a failure location according to node identifiers carried in the failure message determines, according to the determined failure location and a pre-configured virtual local area network distribution topology, the specific virtual local area network affected by the failure, wherein the virtual local area network distribution topology is used to indicate virtual local area networks accessing the Ethernet ring network system and a topological path of nodes that each virtual local area network passes through.

10. The system according to claim 9, wherein the instruction message for flushing the MAC address forwarding table includes a destination address that is an address of the specific node such that the instruction message for flushing the MAC address forwarding table can be sent to the specific node in unicast mode.

* * * * *